United States Patent
Morinaga et al.

(12)

(10) Patent No.: US 11,434,676 B2
(45) Date of Patent: Sep. 6, 2022

(54) MANUFACTURING METHOD OF VEHICLE DOOR HINGE AND VEHICLE

(71) Applicant: MITSUI KINZOKU ACT CORPORATION, Yokohama (JP)

(72) Inventors: Hiroshi Morinaga, Yokohama (JP); Makoto Kondo, Yokohama (JP); Kumiko Sato, Yokohama (JP)

(73) Assignee: Mitsui Kinzoku Act Corporation, Kanagawa (JP)

( * ) Notice: Subject to any disclaimer, the term of this patent is extended or adjusted under 35 U.S.C. 154(b) by 99 days.

(21) Appl. No.: 16/641,815

(22) PCT Filed: Mar. 15, 2018

(86) PCT No.: PCT/JP2018/010319
§ 371 (c)(1),
(2) Date: Feb. 25, 2020

(87) PCT Pub. No.: WO2019/176069
PCT Pub. Date: Sep. 19, 2019

(65) Prior Publication Data
US 2020/0408014 A1    Dec. 31, 2020

(51) Int. Cl.
*B60J 9/00* (2006.01)
*E05D 3/02* (2006.01)
(Continued)

(52) U.S. Cl.
CPC .............. *E05D 3/02* (2013.01); *B60J 5/047* (2013.01); *B62D 65/06* (2013.01); *C25D 7/00* (2013.01);
(Continued)

(58) Field of Classification Search
CPC ........... E05Y 2900/132; E05Y 2900/31; E05Y 2900/20; E05Y 2900/531; F25D 23/028;
(Continued)

(56) References Cited

U.S. PATENT DOCUMENTS

| 4,391,020 A | * | 7/1983 | Hsu | .......................... E05F 1/066 16/314 |
| 4,494,275 A | * | 1/1985 | Hsi-Shan | ................ E05F 1/063 16/314 |

(Continued)

FOREIGN PATENT DOCUMENTS

| CN | 206016508 U | 3/2017 |
| CN | 107097615 A | 8/2017 |

(Continued)

OTHER PUBLICATIONS

Chinese Office Action Corresponding to 2021061701954210 dated Jun. 22, 2021.

(Continued)

*Primary Examiner* — Kiran B Patel
(74) *Attorney, Agent, or Firm* — Finch & Maloney PLLC; Jay S. Franklin; Michael J. Bujold

(57) ABSTRACT

A vehicle door hinge that has a desorption function while enabling weight reduction and increasing production efficiency. The vehicle door hinge comprises a base member (2U) fixed to the door-side of the vehicle, a base member (3U) fixed to the vehicle body side; a hinge shaft (4U) rotatably connects the base members (2U, 3U) to each other; a screwed body (5U) that is detachably screwed in the axial direction to the hinge shaft (4U) so that the base member (3U) and the hinge shaft (4U) rotate integrally; bushes (6U, 7U) fitted into a shaft holes (22U) of the base member (2U) so that the base member (2U) and the hinge shaft can rotate relative to each other; and a retaining portion (8U) for preventing the hinge shaft (4U) from coming off from the shaft hole (22U) of the base member. The base members (2U, 3U) are cast from aluminum alloy.

4 Claims, 15 Drawing Sheets

(51) Int. Cl.
*B60J 5/04* (2006.01)
*B62D 65/06* (2006.01)
*C25D 7/00* (2006.01)
*C25D 11/04* (2006.01)
*E05D 5/02* (2006.01)
*E05D 5/06* (2006.01)

(52) U.S. Cl.
CPC ............ *C25D 11/04* (2013.01); *E05D 5/0207* (2013.01); *E05D 5/062* (2013.01); *E05Y 2600/61* (2013.01); *E05Y 2800/45* (2013.01); *E05Y 2900/531* (2013.01)

(58) Field of Classification Search
CPC ......... F25D 2323/024; F25D 2323/022; E05D 5/08; E05D 1/04
See application file for complete search history.

(56) References Cited

U.S. PATENT DOCUMENTS

| | | | |
|---|---|---|---|
| 5,255,876 A * | 10/1993 | Fleming | E05F 1/1207 49/386 |
| 5,987,703 A | 11/1999 | Klüting et al. | |
| 7,325,276 B2 | 2/2008 | Kim | |
| 8,505,164 B2 | 8/2013 | Katou | |
| 8,893,360 B2 | 11/2014 | Ogawa et al. | |
| 8,984,726 B2 | 3/2015 | Ogawa et al. | |
| 10,100,563 B2 | 10/2018 | Murray et al. | |
| 2006/0174445 A1* | 8/2006 | Kim | E05D 5/128 16/360 |
| 2015/0026924 A1* | 1/2015 | Morinaga | E05D 5/062 16/277 |
| 2017/0241179 A1 | 8/2017 | Moriyama | |
| 2019/0301226 A1* | 10/2019 | Kaburaki | E05D 3/02 |
| 2019/0301229 A1* | 10/2019 | Kitamura | E05D 3/127 |

FOREIGN PATENT DOCUMENTS

| | | |
|---|---|---|
| DE | 697 17 184 T2 | 8/2003 |
| JP | H04212682 A | 8/1992 |
| JP | 11-101048 A | 4/1999 |
| JP | 3046575 B2 | 5/2000 |
| JP | 2005-238326 A | 9/2005 |
| JP | 2006-214259 A | 8/2006 |
| JP | 2009-542942 A | 12/2009 |
| JP | 4625974 B1 | 2/2011 |
| JP | 1792536 B1 | 10/2011 |
| JP | 2017-131997 A1 | 8/2017 |
| WO | 2011/030417 A1 | 3/2011 |

OTHER PUBLICATIONS

Chinese Patent Office, Office Action issued in Chinese Patent Application No. 201980015243.3 dated Jan. 28, 2022.
Kankenho et al., Compatibility and Technology Measurement, pp. 176-177, Bejiing Science and Technology University Press, Jun. 2017.
China Academic Journal Electronic Publishing House, Mining Technology, vol. 14, No. 1 dated Jan. 2014.
International Search Report Corresponding to PCT/JP2018/010319 dated May 29, 2018.

* cited by examiner

MANUFACTURING METHOD OF VEHICLE DOOR HINGE AND VEHICLE

TECHNICAL FIELD OF THE INVENTION

The present invention relates to a manufacturing method of a vehicle door hinge and a vehicle, capable of reducing weight and improving production efficiency.

BACKGROUND OF THE INVENTION

In the automotive field, there is a demand for further weight reduction of a vehicle. For this reason, weight reduction is also required for a door hinge that supports a door of the he vehicle.

On the other hand, the weight of the door of the vehicle itself tends to increase due to the mounting of various safety devices, electric devices, and the like. Therefore, further improvement in support strength of the door hinge is required.

Furthermore, a high-class feeling is required for the closing sound of the door.

In order to meet these requirements, it has become necessary to improve the support rigidity and mounting rigidity of the door hinge.

Moreover, in order to ensure color homogeneity between a door and a vehicle body, a door attaching/detaching work is adopted in a vehicle body assembly process.

In the door attaching/detaching work, the door is assembled to the vehicle body, and the door is painted together with the vehicle body in the assembled state, then the door is removed from the vehicle body and is moved to the next outfitting process.

In the outfitting process, various safety devices, electric devices, and the like are attached to the door, and after then, in the vehicle body assembly process, the door is assembled again.

Therefore, there is a need for a vehicle door hinge that allows the door to be efficiently attached to and detached from the vehicle body.

For example, a vehicle door hinge described in JP 3046575 B has a door-side base member to be fixed to a vehicle door and a vehicle body-side base member to be fixed to a vehicle body, each of which is made of mold steel, and the door hinge also has a desorption function that allows the door to be removed from the vehicle body during the vehicle body assembly process.

Thereby, compared with a sheet metal door hinge manufactured by sheet metal press molding, the door hinge can obtain a rigid opening/closing feeling. Furthermore, the attaching/detaching work of the door from the vehicle body can be performed efficiently.

On the other hand, since the door hinge requires a lot of processing time for cutting the steel mold, the productivity is poor and the cost is increased, and it cannot respond to the demand of a weight reduction.

According to the invention described in JP 2005-238326 A, a door-side base member and a vehicle body-side base member are manufactured as a semi-finished product by casting, and then the semi-finished products are pressed to manufacture a finished product. Thereby, since cutting is not required, productivity can be improved.

However, a hinge shaft is formed integrally with either the door-side base or the vehicle body-side base. Therefore, it does not have a desorption function of the door to the vehicle body.

According to the in the invention described in JP 4625974 B, a vehicle body-side base member and a door-side base member are manufactured as semi-finished products by a bulge processing from a plate-shaped steel material, and then a finished product is manufactured by forming a shaft hole in the semi-finished product by punching or the like. Thereby, it is possible to manufacture a door hinge that is strong but inexpensive.

However, on the other hand, since each base member is manufactured by the bulge processing, an annealing step or the like is required before the shaft hole forming step after the bulge processing step. Therefore, production process management is complicated. Moreover, since the material is made into tabular steel, it cannot respond to the demand of a weight reduction. Furthermore, it does not have a desorption function of the door because of its structure.

The invention described in JP 4792536 B relates to a method of production a vehicle door hinge, that is, the door hinge is manufactured from a steel round bar through a cutting process, a heating process, a hot forging process, a trimming process, a cooling process, a shaft hole forming process, a shaft hole finishing process, and a hole forming process.

However, in order that a production process may require many processes, production process management is complicated. Moreover, since the material is used as steel round bars, it cannot respond to the demand of a weight reduction. Furthermore, it does not have a desorption function of the door on the composition, either.

According to the invention described in JP 2017-131997 A, for manufacturing a door-side base member and/or a vehicle body-side base member, an intermediate member is formed by pressing columnar material by cold forging, then, unnecessary portions of the intermediate member are removed using a shear blade. However, this invention cannot fully meet the demand for weight reduction. Moreover, it does not have a desorption function of a door because of its structure.

SUMMARY OF THE INVENTION

As mentioned above, in the field of the vehicle door hinge, various door hinges manufactured using various methods have been proposed. However, a vehicle door hinge which has a desorption function and enabled to reduce weight and improve production efficiency is not yet realized.

In view of the above issues, an object of the present invention is to provide a manufacturing method of a vehicle door hinge and a vehicle, which has a desorption function and enabling weight reduction and increases production efficiency.

According to the present invention, the subject is solved as follows.

In a manufacturing method of a vehicle door hinge which supports a door to a vehicle body in a state openable and closable, the vehicle door hinge comprises, a door-side base member having a mounting hole into which a bolt for fixing to the door is inserted, and an axial hole extending in a direction perpendicular to the mounting hole, a vehicle body-side base member having a mounting hole into which a bolt for fixing to the vehicle body is inserted, and an axial hole extending in a direction perpendicular to the mounting hole, a hinge shaft that is inserted into a shaft hole of the door-side base member and a shaft hole of the vehicle body-side base member, respectively, and connects the door-side base member and the vehicle body-side base member that can be rotatable with respect to each other, a screwed body that is detachably screwed to one end of the hinge shaft in an axial direction so that the base member on either one of the door-side or the vehicle body-side and the hinge shaft rotate together;

a bush interposed between the shaft hole of the other base member and the other end portion of the hinge shaft so that the other of the base member on the door side or the vehicle body side and the hinge shaft rotate relative to each other, and a retaining portion for preventing the other end portion of the hinge shaft from coming off from the shaft hole of the other base member in the axial direction, wherein at least one base member of the door-side or the vehicle body-side and the vehicle body-side base member is manufactured by casting using an aluminum alloy as a material.

Thereby, while providing a door desorption function, the weight of the door hinge can be reduced, and production efficiency can be improved. In addition, the structure including the caulked portion of the hinge shaft according to the embodiment or the caulked portion and the washer is defined as the retaining portion of the present invention.

Preferably, the one base member is arranged such that a central axis direction of the shaft hole is perpendicular to a split surface of a fixed metal mold and a movable metal mold of a casting metal mold, and parallel to the movable direction of the movable metal mold. Thereby, the shaft hole can be formed without drilling the base member.

Preferably, the mounting hole of the one base member is formed by a slide core provided in the casting metal mold. Thereby, the mounting hole can be formed without requiring drilling for the base member.

Preferably, the screwed body has a conical portion that comes into contact with one tapered portion provided at one inlet of the shaft hole of the one base member, wherein the hinge shaft has an enlarged diameter conical portion that comes into contact with the other tapered portion provided at the other entrance opposite to the one entrance of the shaft hole of the one base member, wherein the conical angle of the conical portion of the screwed body is smaller than the taper angle of the one tapered portion, and wherein the conical angle of the enlarged diameter conical portion of the hinge shaft is smaller than the taper angle of the other tapered portion.

Thereby, the hinge shaft can be firmly fixed to the shaft hole of one base member using the screwed body.

Preferably, electrodeposition coating is applied to the surface of the one base member. Thereby, dissimilar metal contact corrosion can be prevented.

Preferably, the vehicle door hinge includes an upper door hinge that supports the upper part of the door, and a lower door hinge that supports the lower part of the door, wherein the upper door hinge is configured such that the screwed body is detachably screwed to one end of the hinge shaft from below, and wherein the lower door hinge is configured such that the screwed body is detachably screwed onto one end of the hinge shaft from above.

Thereby, a door attaching/detaching work can be done easily.

A vehicle provided with left and right front doors and left and right rear doors, comprising: a lower door hinge and an upper door hinge for supporting the left rear door on the vehicle body; and a lower door hinge and an upper door hinge for supporting the right rear door on the vehicle body, wherein the lower door hinge of the left rear door and the lower door hinge and the upper door hinge of the right rear door have a left-right line symmetric structure, respectively, wherein the lower door hinge for the left rear door and the lower door hinge for the left front door have the same structure, wherein the upper door hinge of the left rear door and the upper door hinge of the left front door have the same structure, wherein the lower door hinge of the right rear door and the lower door hinge of the right front door have the same structure, wherein the upper door hinge for the right rear door and the upper door hinge for the right front door have the same structure.

Thereby, sharing of the lower door hinge and the upper door hinge can be promoted, and the cost can be reduced.

A vehicle provided with left and right front doors and left and right rear doors, comprising: a lower door hinge and an upper door hinge according to claim 6 for supporting the left rear door on the vehicle body; and a lower door hinge and an upper door hinge according to claim 6 for supporting the right rear door on the vehicle body, wherein the lower door hinge and the upper door hinge of the left rear door, and the lower door hinge and the upper door hinge of the right rear door have a left-right line symmetric structure, respectively, wherein the upper door hinge of the right front door has a structure in which the lower door hinge of the left rear door is rotated by 180°, wherein the lower door hinge for the right front door is a structure obtained by rotating the upper door hinge for the left rear door by 180°, wherein the upper door hinge of the left front door has a structure in which the lower door hinge of the right rear door is rotated by 180°, wherein the lower door hinge of the left front door has a structure in which the upper door hinge of the right rear door is rotated 180°.

Thereby, costs can be reduced by promoting the sharing of the lower door hinge and the upper door hinge.

According to the present invention, while by making the screwed body attachable to and detachable from the hinge shaft, provides a door desorption function, and by producing at least the base member on either the door-side or the vehicle body-side by casting using an aluminum alloy material, weight of the door hinge can be reduced and production efficiency can be increased.

DETAILED DESCRIPTION OF THE EMBODIMENTS

Hereinafter, the best embodiments of the invention of the present invention will be described with reference to the drawings.

A vehicle door hinge includes an upper door hinge 1U for pivotally supporting an upper part of a door to a vehicle body, and a lower door hinge 1L for pivotally supporting a lower part of the door to the vehicle body.

A swing type door that is supported on a vehicle body side that can be opened and closed is pivotally supported on the vehicle body by the upper door hinge 1U and the lower door hinge 1L.

Figure 7:
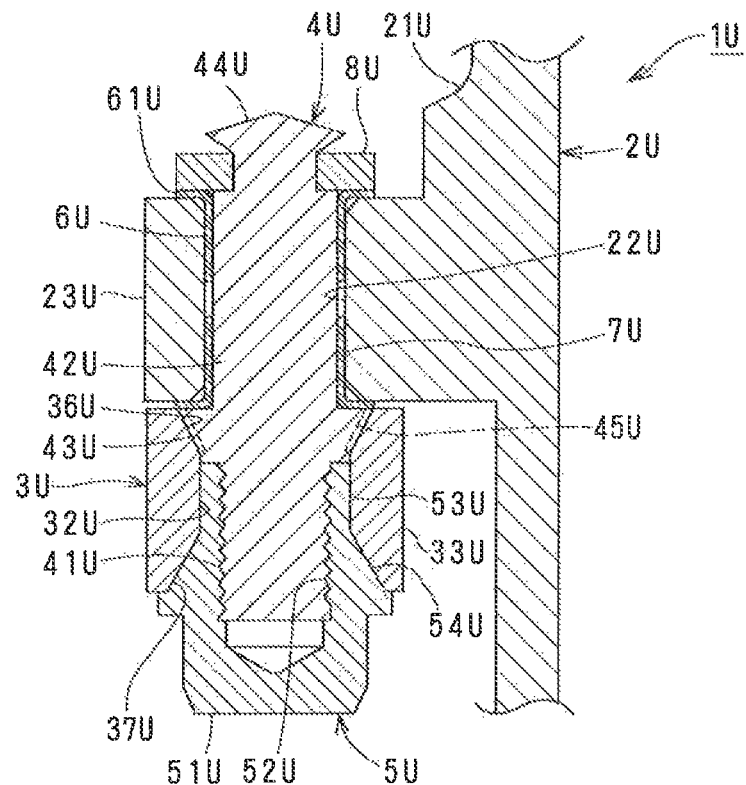
FIG. 7 is an enlarged vertical sectional view taken along line VII-VII in FIG. 2A.
Figure 8:
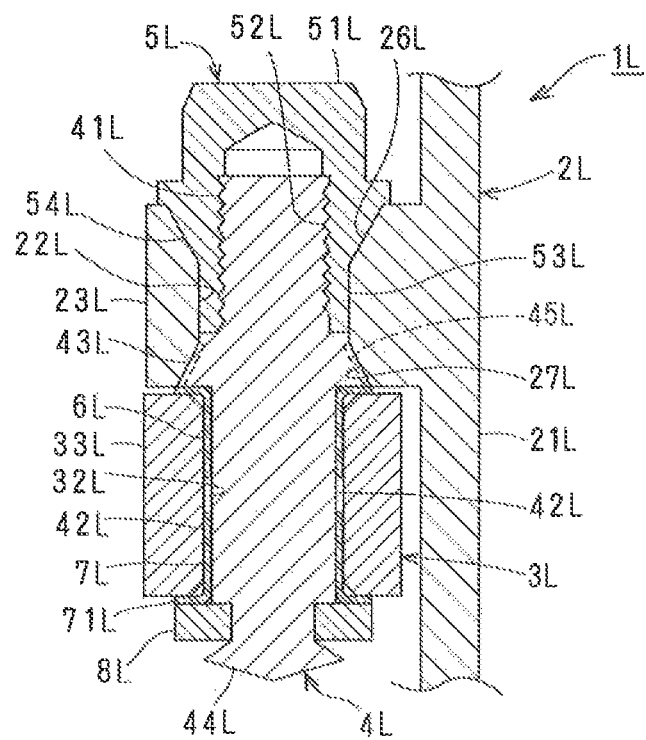
FIG. 8 is an enlarged vertical sectional view taken along line VIII-VIII in FIG. 2A.
Figure 9:
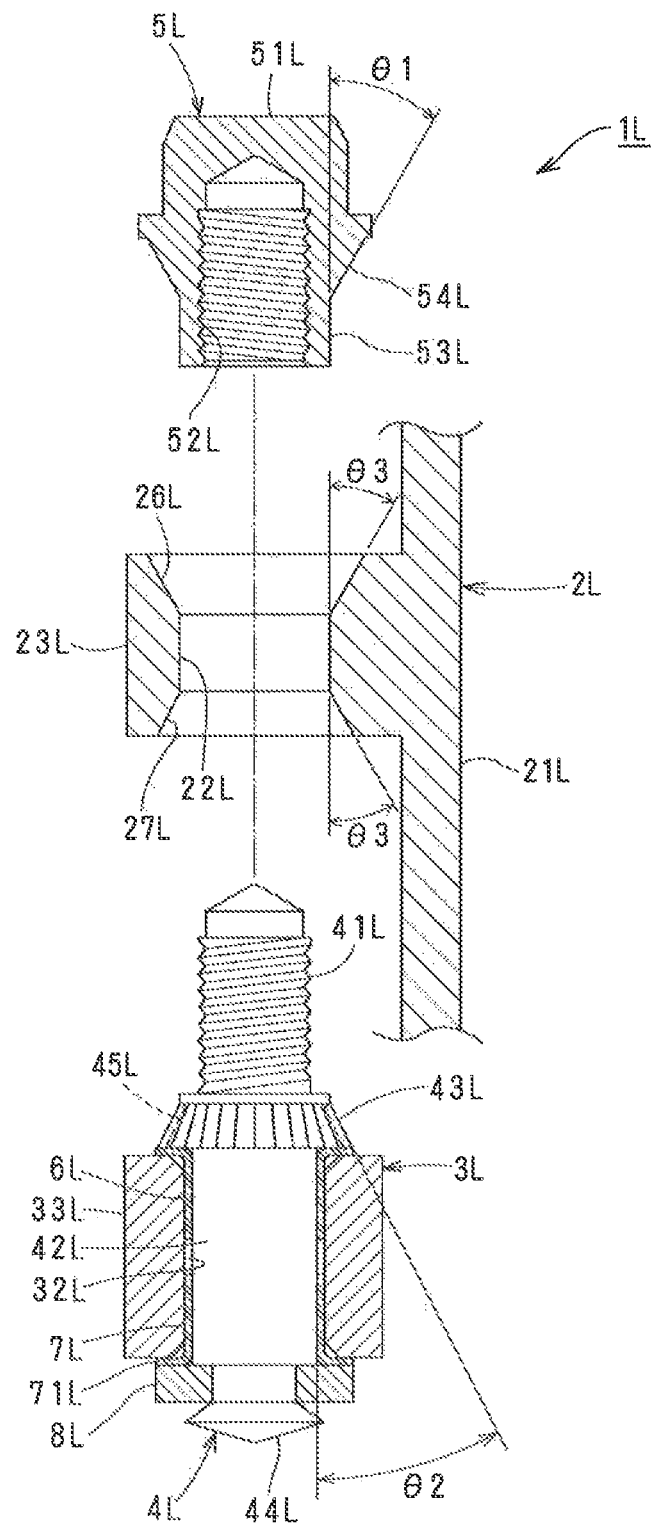
FIG. 9 is an exploded view of the lower door hinge at the same part as in FIG. 8.

FIGS. 1A, 2A, 3, 5A and 6A show the structure of the upper door hinge 1U, and FIGS. 1B, 2B, 4, 5B and 6B show the structure of the lower door hinge 1L. FIG. 7 shows the enlarged vertical longitudinal sectional view of the principal part of the upper door hinge 1U. FIGS. 8 and 9 show the enlarged vertical longitudinal sectional view of the principal part of the lower door hinge 1L.

The upper door hinge 1U and the lower door hinge 1L according to the embodiment are for the left rear door (hereinafter referred to as "door") that supports the left rear door D to be openable and closable on the vehicle body B.

In addition, the upper door hinge and the lower door hinge for the right rear door that support the rear door on the vehicle body so as to be opened and closed are in a left-right line symmetric structure relationship with the upper door hinge 1U and the lower door hinge 1L for the left rear door.

The door D attached to the vehicle body B by the upper door hinge 1U and the lower door hinge 1L according to the embodiment is, in a body assembly process, painting with the vehicle body B, then, the door is removable from the vehicle body B, and after the removing, various safeguards, dynamo-electric means, etc. are attached to the door D in an outfitting process. Then, the door D can be assembled to the vehicle body B again in the vehicle body assembly process.

In the description of the door hinge for the vehicle, first, each component of the upper door hinge 1U will be described, and then each component of the lower door hinge 1L will be described.

In addition, the external shapes of the upper door hinge 1U and the lower door hinge 1L are different from each other due to the relationship between the vehicle body structure and the door structure to be attached. However, both hinges have the same basic function of each element. Therefore, regarding the reference numerals given to the constituent elements of the upper door hinge 1U and the lower door hinge 1L, the same Arabic numerals are used for the constituent elements having the same function.

Furthermore, in order to distinguish the upper door hinge 1U and the lower door hinge 1L, "U" is given after Arabic numerals about the upper door hinge 1U, and "L" is given after Arabic numerals about the lower door hinge 1L.

The upper door hinge 1U includes a door-side base member 2U fixed to the door D side, a vehicle body-side base member 3U fixed to the vehicle body B side, a hinge shaft 4U, and a screwed body 5U.

The upper half of the hinge shaft 4U is assembled to the door-side base member 2U such that the hinge shaft 4U can be rotatable and substantially un-removable in the axial direction, and the lower half of the hinge shaft 4U is assembled to the vehicle body-side base member 3U such that the hinge shaft 4U can't be rotatable but detachable in the axial direction. Thus, the hinge shaft 4U is configured to be able to connect the door-side base member 2U and the vehicle body-side base member 3U that can rotate with each other.

The screwed body 5U is detachably screwed with a male screw portion 41U provided at the lower part of the hinge shaft 4U, from below.

The upper door hinge 1U has a desorption function capable of detaching the door-side base member 2U from the vehicle body-side base member 3U, by removing the screwed body 5U from the male screw portion 41U of the hinge shaft 4U from below, while the vehicle body-side base member 3U is fixed to the vehicle body B.

Figure 3:
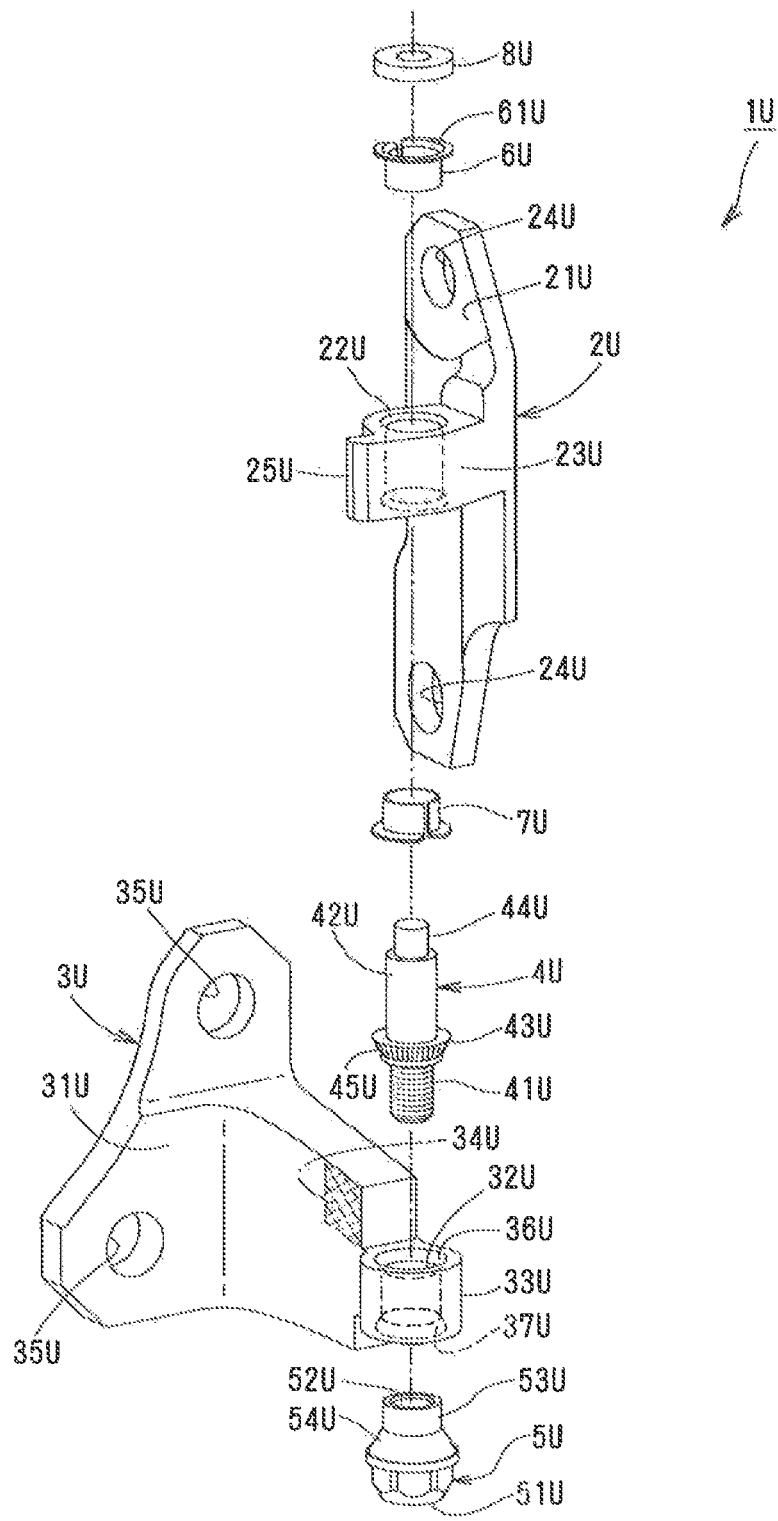
FIG. 3 is an exploded perspective view of the upper door hinge.

As shown in FIGS. 3 and 7, in order to provide the desorption function, in the hinge shaft 4U, a male screw portion 41U, a rotation portion 42U, an enlarged diameter conical portion 43U, and a small diameter portion 44U are integrally formed of steel.

The male screw portion 41U constitutes the lower half portion of the hinge shaft and is inserted into the shaft hole 32U of the door-side base member 3 in a non-rotatable manner. The screwed body 5U is detachably screwed with the male screw portion 41U.

The rotation portion 42U is formed in the upper half portion of the hinge shaft and is inserted rotatably in the shaft hole 22U of the door-side base member 2U.

The enlarged diameter conical portion 43U is formed between the male screw portion 41U and the rotation portion 42U, and the small diameter portion 44U is formed in the upper end of the rotation portion 42U.

A serration 45U is engraved on the conical surface facing the lower side of the enlarged diameter conical portion 43U.

In addition, the small diameter portion 44U is caulked after the hinge shaft 4U is inserted into the shaft hole 22U of the door-side base member 2U so that the hinge shaft 4U may not be extracted from the shaft hole 22U.

In the screwed body 5U, a hexagonal head portion 51U in the lower half, a cylindrical part 53U in the upper half, and a conical portion 54U are integrally formed of steel. As for the cylindrical portion 53U, a female screw portion 52U that can be screwed with the male screw portion 41U of the hinge shaft 4U is engraved on the inner peripheral surface. The conical portion 54U is provided between the head portion 51U and the cylindrical portion 53U, and the diameter is gradually reduced upward.

The door-side base member 2U is manufactured by casting using an aluminum alloy as a material in order to reduce weight and improve production efficiency. In the door-side base member, a base portion 21U fixed to the mounting surface (a vertical surface) of the door D with bolts and a bearing portion 23U are integrally formed. The bearing portion 23U is provided with a vertical shaft hole 22U into which the rotation portion 42U of the hinge shaft 4U is inserted that can be relatively rotatable.

Preferably, when the door D is steel, in order to prevent foreign metal contact corrosion that occurs on the contact surface with the door D, electrodeposition coating processing is performed to the surface of the door-side base member 2U. When the door D is aluminum, since it is not necessary to prevent foreign metal contact corrosion, the surface is subjected to an anodized aluminum treatment (anodizing treatment) as dust protection.

The mounting holes 24U and 24U are formed in the base portion 21U of the door-side base member 2U. These mounting holes penetrate in the front rear direction in which the bolt (not shown) for fixing the base portion 21U to the door D can be inserted from the front, that is, in the direction orthogonal to the shaft hole 22U.

On the outer periphery of the bearing portion 23U of the door-side base member 2U, a stopper portion 25U protruding outward from the outer peripheral surface is provided. The stopper portion 25U regulates the fully open position of the door D by contacting a contact surface 34U of the vehicle body-side base member 3U.

As can be understood from FIGS. 3 and 7, in order to allow the rotating part 42U of the hinge shaft 4U to rotate smoothly in the shaft hole 22U of the door-side base member 2U, into the shaft hole 22U, an upper bush 6U having an upper hook shape is fitted from the upper side and an upper bush 7U having a lower hook shape is fitted from the lower side respectively, substantially in a non-rotatable manner.

The small diameter portion 44U of the hinge shaft 4U protruding upward from the upper bush 6U is caulked as a retaining portion so that the portion cannot be removed from the shaft hole 22U. In this case, a flange 61U is formed in advance on the upper bush 6U. For this reason, there is no need to provide a flange on the bush 6U when the hinge shaft 4U is caulked. Preferably, a washer 8U is interposed between the caulked portion and the flange 61U of the upper bush 6U.

Thereby, the rotation portion 42U of the hinge shaft 4U is assembled to the shaft hole 22U of the door-side base member 2U through the upper bushes 6U, 7U, in a state in which it is rotatable and it cannot be extracted in the axial direction. The inner peripheral surfaces of the bushes 6U, 7U are subjected to surface treatment so that the rotation portion 42U of the hinge shaft 4U can be smoothly rotated without rattling.

Regarding to the vehicle body-side base member 3U, similar to the door-side base member 2U, in order to reduce weight and improve production efficiency, a base portion 31U and a bearing portion 33U are integrally formed from aluminum alloy material by casting. The base portion 31U is fixed to a mounting surface (a vertical surface) of the vehicle body B with a bolt. In the bearing portion 33U, a shaft hole 32U is formed in the vertical direction. The shaft hole 32U is provided below the bearing portion 23U of the door-side base member 2U and the male screw portion 41U of the hinge shaft 4U is inserted into the shaft hole.

When the vehicle body B is steel, the surface of the vehicle body-side base member 3U is preferably subjected to an electrodeposition coating process, in order to prevent dissimilar metal contact corrosion occurring on the contact surface with the vehicle body B. When the vehicle body B is aluminum, it is not necessary to prevent the contact corrosion of different metals, and thus an anodized aluminum treatment (anodization treatment) is performed.

Mounting holes 35U, 35U are formed in the base portion 31U. These mounting holes penetrate in the left-right direction, that is, the direction orthogonal to the shaft hole 32U so that a bolt for fixing the base portion 31U to the vehicle body B can be inserted from the outside of the vehicle.

The male screw portion 41U of the hinge shaft 4U is inserted into the shaft hole 32U of the vehicle body-side base member 3U from above, and the cylindrical portion 53U of the screwed body 5U is inserted the shaft hole from below, and in this state, the female screw portion 52U of the screwed body 5U is screwed with the male screw portion 41U of the hinge shaft 4U. Thereby, the male screw portion 41U of the hinge shaft 4U is fixed to the shaft hole 32U of the vehicle body-side base member 3U so as not to rotate. The door D can be removed from the vehicle body B by removing the screwed body 5U from the male screw portion 41U of the hinge shaft 4U, from the lower side, and displacing the door D upward, while each of the vehicle body-side base member 3U is fixed to the vehicle body B and the door-side base member 2U is fixed to the door D.

In addition, in the upper door hinge 1U, the reason why the screwed body 5U is attached and detached from the lower side is that, a space for attaching and detaching the screwed body 5U can be easily secured with respect to the curved door D whose upper and lower central portions bulge outward in a front view of the door.

A tapered portion 36U is provided at the upper entrance of the shaft hole 32U so that a serration 45U provided on the diameter-enlarged diameter conical portion 43U of the hinge shaft 4U contacts. Similarly, a tapered portion 37U with which the conical portion 54U of the screwed body 5U comes into contact is provided at the lower entrance of the shaft hole 32U.

By screwing the screwed body 5U into the male screw portion 41U of the hinge shaft 4U and tightening the head portion 51U with a tool, the conical portion 54U of the screwed body 5U is fitted into the tapered portion 37U on the lower side of the shaft hole 32U of the vehicle body-side base member 3U from below by a wedge action. Thereby, the external thread part 41U of the lower half part of the hinge shaft 4U can be firmly fixed to the shaft hole 32U of the vehicle body-side base member 3U.

Further, by tightening the screwed body 5U, the serration 45U of the enlarged diameter conical portion 43U of the hinge shaft 4U is also fitted into the tapered portion 36U on the upper side of the shaft hole 32U from above by a wedge action. Thereby, the male screw portion 41U of the lower half part of the hinge shaft 4U is more firmly fixed to the shaft hole 32U of the vehicle body-side base member 3U.

In the embodiment, as an example, the conical angle of the conical portion 54U of the screwed body 5U (the angle θ1 shown in FIG. 9) is set to 26 degrees, the conical angle of the enlarged diameter conical portion 43U of the hinge shaft 4U (the angle θ2 shown in FIG. 9) is set to 28 degrees, and the taper angle of the upper and lower tapered portions 36U and 37U of the shaft hole 32U (the angle θ3 shown in FIG. 9) is set to 30 degrees, which is larger than θ1 and θ2. That is, the angles of the respective parts are set so as to have a relationship of θ1<θ2<θ3.

By setting the angles in this manner, the conical portion 54U of the screwed body 5U can be more reliably fitted into the tapered portion 37U below the shaft hole 32U of the vehicle body-side base member 3U. Therefore, the serration 45U of the enlarged diameter conical portion 43U of the hinge shaft 4U can be more securely fitted into the tapered portion 36U on the upper side of the shaft hole 32U of the vehicle body-side base member 3U.

Next, each component of the lower door hinge 1L will be described. In addition, a hinge shaft 4L and a screwed body 5L of the lower door hinge 1L are vertically symmetrical with the hinge shaft 4U and the screwed body 5U of the upper door hinge 1U. Therefore, those explanations will be briefly described.

The lower door hinge 1L includes a door-side base member 2L fixed to the door D side, a vehicle body-side base member 3L fixed to the vehicle body B side, the hinge shaft 4L, and the screwed body 5L. The lower half portion of the hinge shaft 4L is assembled to the vehicle body-side base member 3L so as to be rotatable and substantially cannot be pulled out in the axial direction. The upper half portion of the hinge shaft 4L is assembled to the door-side base member 2L so as not to be rotatable but to be detachable in the axial direction. The hinge shaft 4L faces in the up-down direction so that the door-side base member 2L and the vehicle body-side base member 3L can be connected to each other so as to be rotatable. The screwed body 5L is detachably screwed to a male screw portion 41L provided on the upper half of the hinge shaft 4L, and is detachably screwed from above.

Accordingly, the lower door hinge 1L has a desorption function that allows the door-side base member 2L to be detached from the vehicle body-side base member 3L, by removing the screwed body 5L from the male screw portion 41L of the hinge shaft 4L from above.

The reason why the screwed body 5L is attached/detached from above in the lower door hinge 1L is that a space for attaching/detaching the screwed body 5L can be easily secured for the curved door D as described above.

Figure 4:
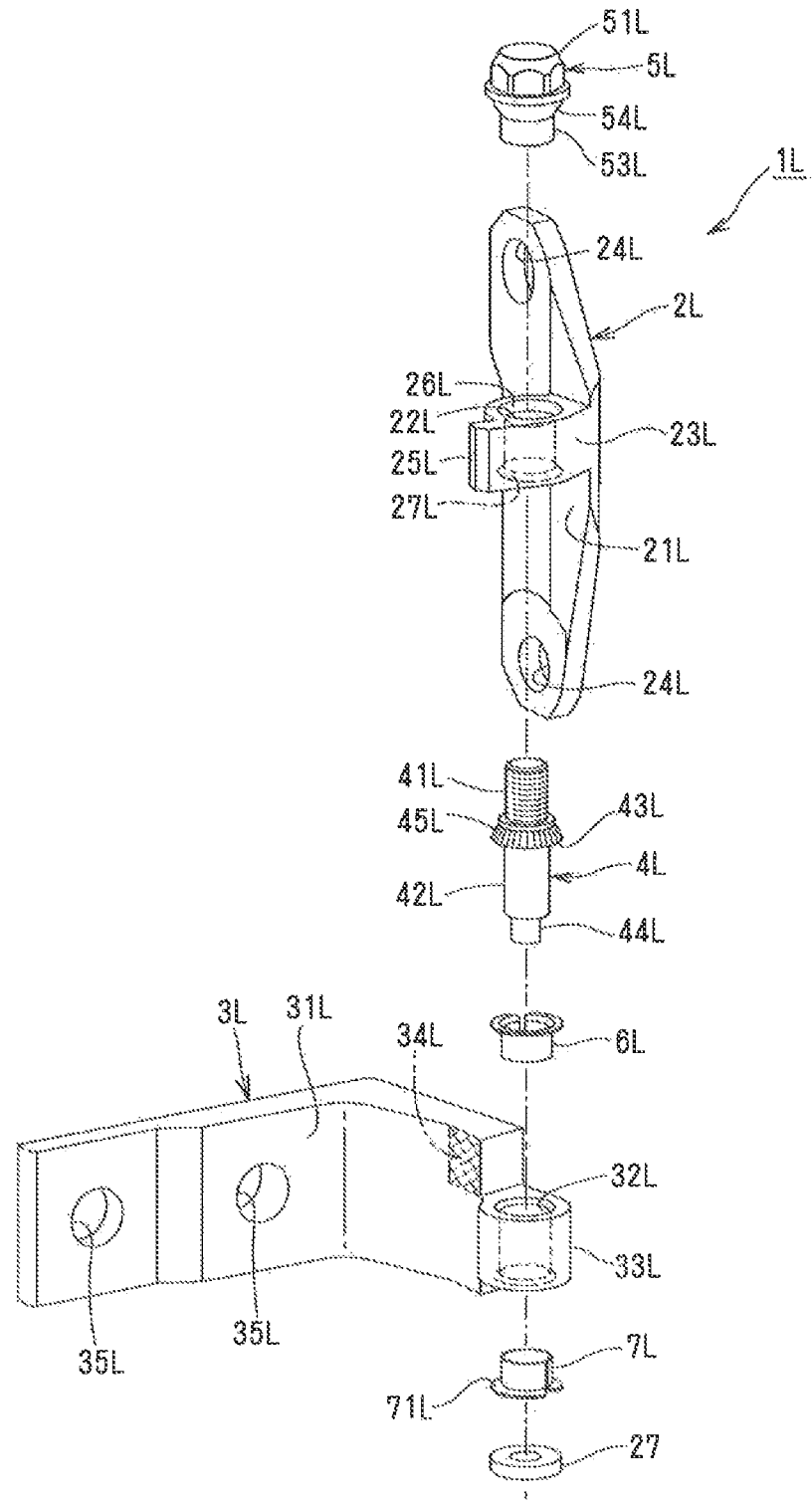
FIG. 4 is an exploded perspective view of the lower door hinge.
Figure 5A:
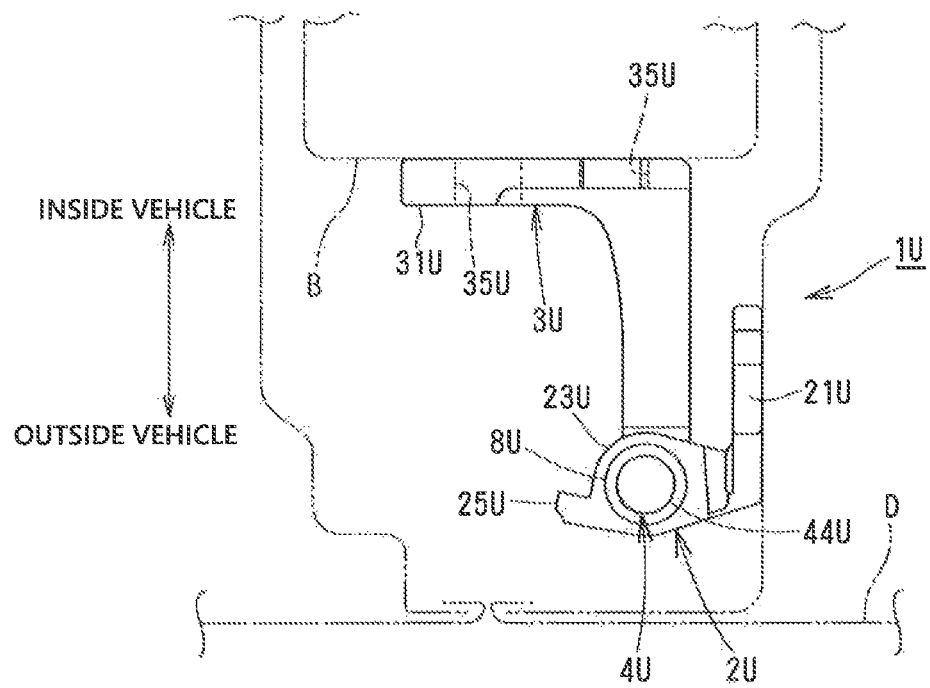
FIG. 5A is a plan view of the upper door hinge.
Figure 5B:
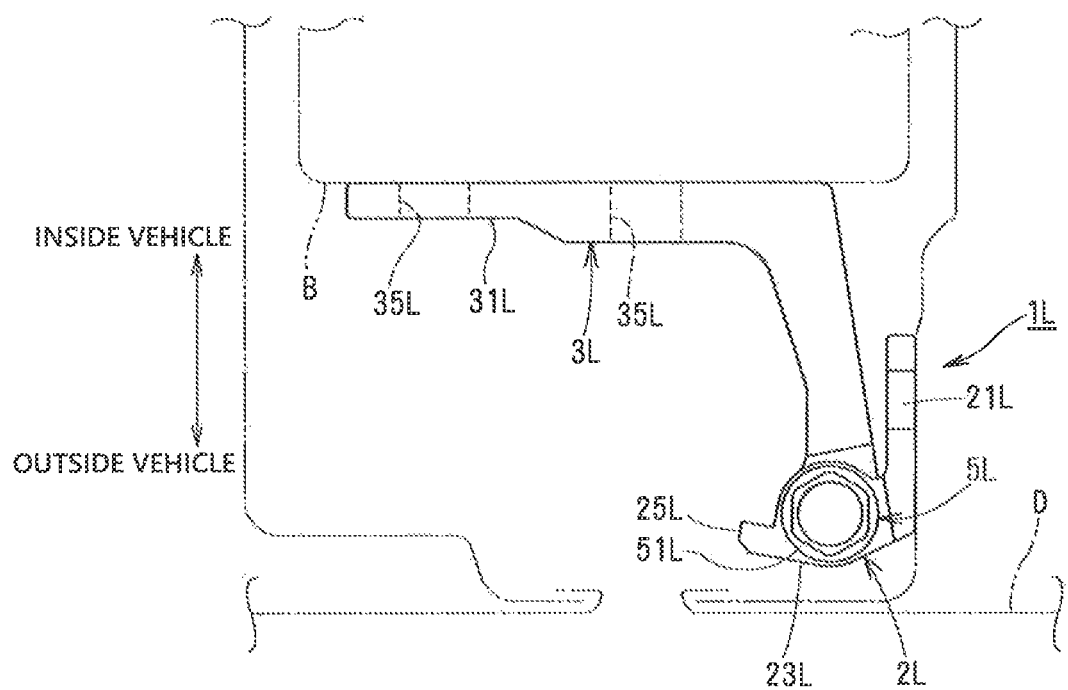
FIG. 5B is a plan view of the lower door hinge.

As shown in FIGS. 4, 8, and 9, in order to provide the desorption function, the hinge shaft 4L is formed integrally the male screw portion 41L provided in the upper half part, a rotation portion 42L provided in the lower half part, an enlarged diameter conical portion 43L provided between the male screw portion 41L and the rotating part 42L, and a small diameter portion 44L provided at the lower end of the rotating part 42L.

A serration 45L is engraved on the conical surface facing the upper side of the enlarged diameter conical portion 43L. After inserting the hinge shaft 4L in a shaft hole 32L of the body-side base member 3L, the small diameter portion 44L is caulked so that it cannot be removed from the shaft hole 32L.

In the screwed body 5L, an upper half head 51L, a lower half cylindrical portion 53L, and a conical portion 54L between the head 51L and the cylindrical portion 53L are integrally formed. On the inner peripheral surface of the cylindrical portion 53L, a female screw portion 52L that can be screwed into the male screw portion 41L of the hinge shaft 4L is engraved. The diameter of the conical portion 54L is gradually reduced downward.

The door-side base member 2L is manufactured by casting from an aluminum alloy material in order to reduce weight and improve production efficiency. The door-side base member 2L is formed integrally a base portion 21L and a bearing portion 23L. The base portion 21L is fixed to a mounting surface (vertical surface) of the door D with a bolt (not shown). A vertical shaft hole 22L into which the male thread portion 41L of the hinge shaft 4L is inserted is formed in the bearing portion 23L. In the base portion 21L of the door-side base member 2L, mounting holes 24L, 24L are formed so as to penetrate in the front-rear direction that allows a bolt for fixing the base portion 21L to the door D to be inserted from the front, that is, in the direction orthogonal to the shaft hole 22L.

On the surface of the door-side base member 2L, in order to prevent the dissimilar metal contact corrosion which arises in a contact surface with the door D, the same surface treatment as the door-side base member 2U is performed.

On the outer periphery of the bearing portion 23L of the door-side base member 2L, a stopper portion 25L that protrudes outward from the outer peripheral surface and restricts the fully open position of the door D is provided. The stopper portion 25L abuts against a contact surface 34L of the vehicle body-side base member 3L, thereby regulating the fully open position of the door D in cooperation with the stopper portion 25U of the upper door hinge 1U.

Into the shaft hole 22L of the door-side base member 2L, the male screw portion 41L of the hinge shaft 4L is inserted from below, and the cyindrical part 53L of the screwed body 5L is inserted from above, and in this state, the female screw portion 52L of the screwed body 5L is screwed with the male screw portion 41L of the hinge shaft 4L. As a result, the male screw portion 41L of the hinge shaft 4L is fixed to the shaft hole 22L of the door-side base member 2L so as not to rotate.

Further, by removing the screwed body 5L from the male screw portion 41L of the hinge shaft 4L from above, and displacing the door D upward, the door D can be removed from the vehicle body B while the door base member 2L is fixed to the door D and the vehicle body base member 3L is fixed to the vehicle body B.

A tapered portion 26L with which conical portion 54L of screwed body 5L contacts is provided at the upper inlet portion of the shaft hole 22L, and a tapered portion 27L with which a serration 45L provided on the diameter-enlarged diameter conical portion 43L of the hinge shaft 4L abuts is provided at the lower inlet portion of the shaft hole 22.

By screwing the screwed body 5L into the male screw portion 41L of the hinge shaft 4L and tightening it with a tool, the conical portion 54L of the screwed body 5L is fitted into the tapered portion 26L on the upper side of the shaft hole 22L of the door-side base member 2L by a wedge action from above. Moreover, at the same time, the serration 45L of the enlarged diameter conical portion 43L of the hinge shaft 4L is internally fitted to the lower tapered portion 27L of the shaft hole 22L by a wedge action from below. Therefore, the upper half of the hinge shaft 4L is firmly fixed to the shaft hole 22L of the door-side base member 2L.

According to the embodiment, as an example, same as the upper door hinge 1U, the conical angle θ1 of the conical portion 54L of the screwed body 5L is set 26 degrees, the conical angle θ2 of the enlarged diameter conical portion 43L of the hinge shaft 4L is set 28 degrees, and the taper angle θ3 of the upper and lower tapered portions 26L, 27L of the shaft hole 22L is set to 30 degrees which is larger than θ1 and θ2. As a result, the conical portion 54L of the screwed body 5L can be securely fitted into the tapered portion 26L on the upper side of shaft hole 22L of door-side base member 2L, and the serration 45L of the enlarged diameter conical portion 43L of the hinge shaft 4L can be reliably fitted into the tapered portion 27L below the shaft hole 22L of the door-side base member 2L.

The vehicle body-side base member 3L is manufactured by casting using an aluminum alloy as a raw material in order to reduce the weight and improve the production efficiency, similarly to the door-side base member 2L. A base part 31L and a bearing part 33L of the vehicle body-side base member 3L are integrally formed. The base portion 31L is fixed to the mounting surface (a vertical surface) of the vehicle body B with bolts. The bearing portion 33L is lower than the bearing portion 23L of the door-side base member 2L and is provided with a vertical shaft hole 32L into which the rotation portion 42L of the hinge shaft 4L is inserted.

Mounting holes 35L, 35L are formed in the base portion 31L, and these mounting holes penetrate in a left-right direction in which a bolt (not-illustrated) for fixing the base portion 31L to the vehicle body B can be inserted from the outside of the vehicle that is, the direction orthogonal to the shaft hole 32L.

In order for the rotating portion 42L of the hinge shaft 4L to rotate smoothly in the shaft hole 32L, into the shaft hole 32L of the vehicle body-side base member 3LA, a bush 6L from above and a bush 7L from below are fitted substantially in a non-rotatable manner. The bush 6L has a flange on the upper side, and the bush 7L has a flange on the lower side. The small diameter portion 44L of the hinge shaft 4L protruding downward from the lower bush 7L is caulked so that it cannot be extracted from the shaft hole 32L. Preferably, a washer 8L is interposed between the caulked portion and a flange 71L of the lower bush 7L.

As a result, the rotation portion 42L of the hinge shaft 4L is assembled to the shaft hole 32L of the vehicle body-side base member 3L via the lower bushes 6L, 7L that can be relatively rotatable and not extractable in the axial direction.

Next, the procedure for assembling the door D to the vehicle body B and removing the door from the vehicle body, according to the present embodiment will be described.

Where the door-side hinge members 2L, 2U and the body side hinge members 3L, 3U of each other are separated, the door-side hinge members 2U, 2L are fixed to the door D with a bolt in advance, and the vehicle body side hinge members 3U, 3L are fixed to the vehicle body B with bolts (not shown) in advance.

Figure 6A:
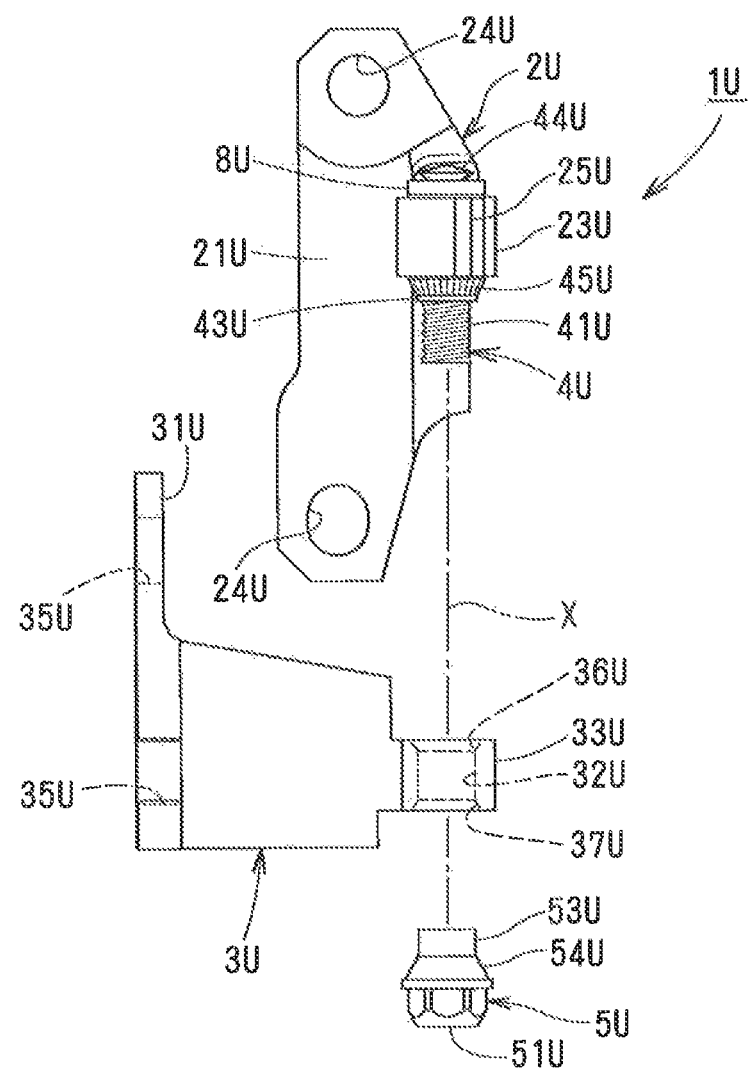
FIG. 6A is a front view of the upper door hinge for explaining an attaching/detaching method.
Figure 6B:
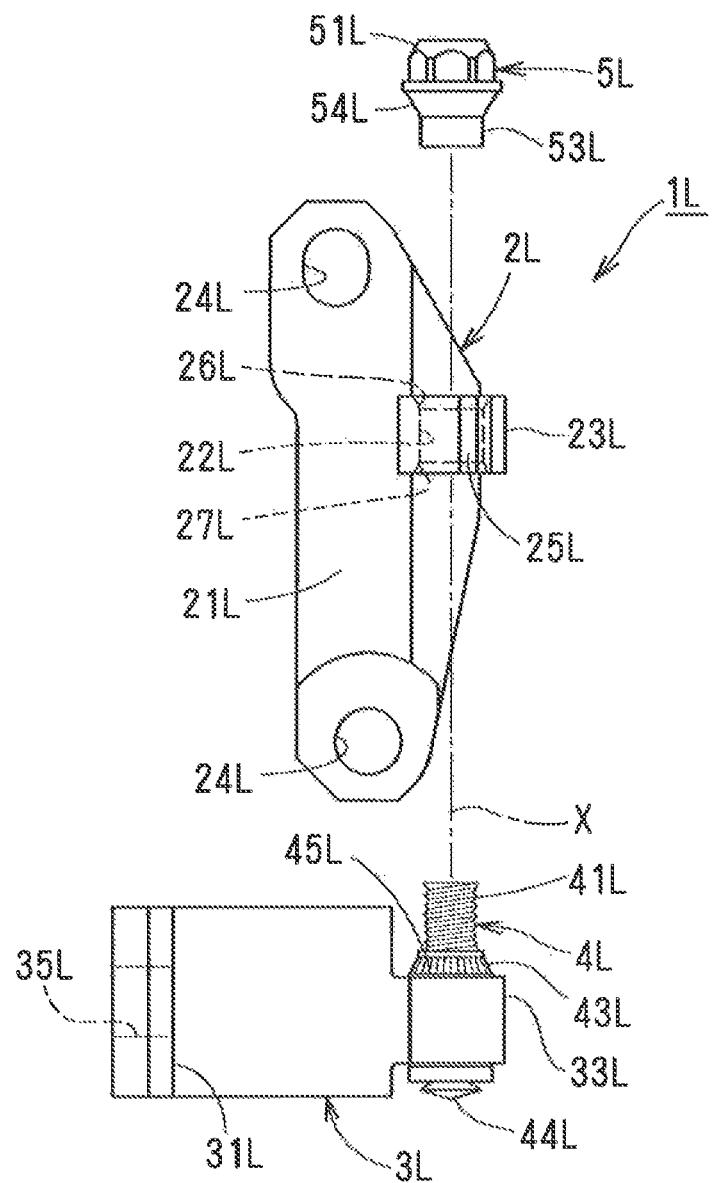
FIG. 6B is a front view of the lower door hinge for explaining an attaching/detaching method.

In the vehicle body assembly process, when assembling the door D to the vehicle body B, regarding the upper door hinge 1U, as can be seen from FIG. 6A, the male screw portion 41U of the hinge shaft 4U attached to the door-side hinge member 2U is inserted into the shaft hole 32U of the vehicle body side hinge member 3U fixed to the vehicle body B, from above. Regarding the lower door hinge 1L, as can be seen from FIG. 6B, the shaft hole 22L of the door-side hinge member 2L is externally fitted to the male screw portion 41L of the hinge shaft 4L assembled to the vehicle body side hinge member 3L, from above.

Further, regarding the upper door hinge 1U, the screwed body 5U is screwed with the male screw portion 41U of the hinge shaft 4U from below and tightened. Regarding the lower door hinge 1L, the screwed body 5L is screwed with the male screw portion 41L of the hinge shaft 4L from above and tightened. Thereby, the door D is temporarily assembled to the vehicle body B.

Then, after painting and other processing in the car body assembly process, regarding the upper door hinge 1U, the screwed body 5U is removed from the male screw portion 41U of the hinge shaft 4, from below. Regarding the lower door hinge 1L, the screw 5L is removed from the male screw portion 41L of the hinge shaft 4L, from above. Thereby, the door D can be removed from the vehicle body B while the door-side base members 2L and 2U are in the state of fixed to the door D, and while the vehicle body-side base members 3L and 3U are in the state of fixed to the vehicle body B.

The removed door D is transferred to an outfitting process, and various devices are mounted. The door D on which various devices are mounted is assembled to the vehicle body B as described above. The screw bodies 5L and 5U are finally fastened to the male screw portions 41L and 41U of the hinge shafts 4L and 4U, respectively.

Next, a manufacturing method of the door-side hinge member 2U and the vehicle body side hinge member 3U of the upper door hinge 1U, and the door-side hinge member 2L and the vehicle body side hinge member 3L of the lower door hinge 1L will be described. Since all the manufacturing methods of each hinge member 2U, 2L, 3U, 3L are the same, therefore, in the following, the manufacturing method thereof will be described using the door-side hinge member 2U of the upper door hinge 1U as an example. The other hinge members 2L, 3L, and 3U can be easily understood from the above description.

Figure 10:
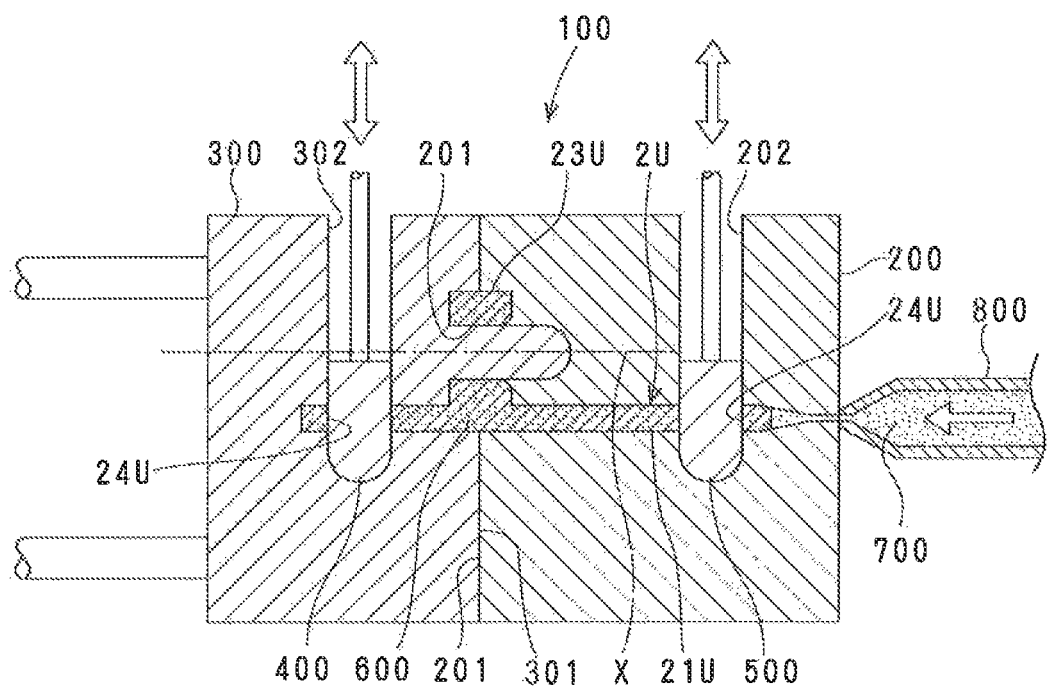
FIG. 10 is a cross-sectional view of a metal mold for explaining a manufacturing method of the vehicle door hinge according to the embodiment of the present invention.

FIG. 10 is an explanatory view of a casting metal mold 100 for production the door-side hinge member 2U.

In the embodiment, the door-side hinge member 2U is manufactured based on an aluminum die casting method, in which molten metal, which is a raw material aluminum alloy, is poured at a high pressure with a plunger. The casting metal mold 100 includes a fixed metal mold 200, a movable metal mold 300, and slide cores 400, 500 and is constituted such that a cavity 600 is formed in the casting metal mold 100 by the fixed metal mold 200 and the movable metal mold 300.

The cavity 600 is filled with molten metal 700 injected from the molten metal supply port by sliding of the plunger (not shown) within a sleeve 800.

The movable metal mold 300 can be moved back and forth in a direction perpendicularly with a split surface 201 of the fixed metal mold of the fixed metal mold 200 facing a split surface 301 of the movable metal mold, that is, in the left-right direction in FIG. 10. When the movable metal mold 300 moves forward to the right direction of FIG. 10, and the split surface 301 of the movable metal mold and the split surface 201 of the fixed metal mold come into contact each other, so that clamping is performed to define the cavity 600. Moreover, it is constituted that, when the movable metal mold 300 is retracted to the left in FIG. 10, and the split surface 301 of the movable metal mold and the split surface 201 of the fixed metal mold are separated from each other, so that the mold is opened.

Preferably, the cavity 600 is defined such that a plurality of door-side hinge members 2U, which are molded products by casting, can be obtained.

The slide core 400 is configured movable up and down in a guide hole 302 provided in the movable metal mold 300 that can insert into the cavity 600. When the slide core 400 is lowered to the state shown in FIG. 10 with respect to the cavity 600, the slide core is in a position where it can be clamped. Moreover, when the slide core is retreated from the cavity 600 by moving upward from the state of FIG. 10 with respect to the movable metal mold 300, the door-side hinge member 2U solidified in the cavity 600 can be removed from the movable metal mold 300.

The slide core 500 is configured movable up and down in a guide hole 202 provided in the fixed metal mold 200 that can insert into the cavity 600. When the slide core 500 is lowered to the state shown in FIG. 10 with respect to the cavity 600, the slide core is in a position where it can be clamped. Moreover, when the slide core is retreated from the cavity 600 by moving upward from the state of FIG. 10 with respect to the fixed metal mold 200, the door-side hinge member 2U solidified in the cavity 600 can be removed from the fixed metal mold 200.

The door-side hinge member 2U which is a molded product removed from cavity 600 is then deburred at a portion necessary for finishing and becomes a finished product.

The door-side hinge member 2U in the cavity 600 is manufactured such that the direction of the central axis X of the shaft hole 22U is the left-right direction in FIG. 10, that is, the direction is parallel to the advancing/retreating direction of the movable metal mold 300. Thereby, the shaft hole 22U of the door-side hinge member 2U can be formed without performing drilling at another process.

The mounting holes 24U, 24U of the door-side hinge member 2U are formed by the slide cores 400 and 500 provided in the fixed metal mold 200 and the movable metal mold 300, respectively. Thereby, after the door-side hinge member 2U is manufactured by casting, it is not necessary to perform drilling at another process for forming the mounting holes 24U, 24U.

In FIG. 10, a casting draft angle of about 0.3 degrees or less is formed on the left and right portions of the base portion 21U of the door-side hinge member 2U with respect to the advancing/retreating direction of the movable metal mold 300, that is, the direction of the central axis X of the shaft hole 22U.

As can be understood from the above description, by constructing the lower door hinge 1L and the upper door hinge 1U are configured as in the embodiment and by manufacturing each of the hinge members 2L, 2U, 3L, 3U by casting using an aluminum alloy as a material, in the vehicle body assembly process, the door D can be attached to and detached from the vehicle body B, while the door-side hinge member 2L, 2U are fixed to the door D and the vehicle body side hinge member 3L, 3U are fixed to the vehicle body B, so that the lower door hinge 1L and the upper door hinge 1U can be reduced in weight and production efficiency can be improved.

Figure 11A:
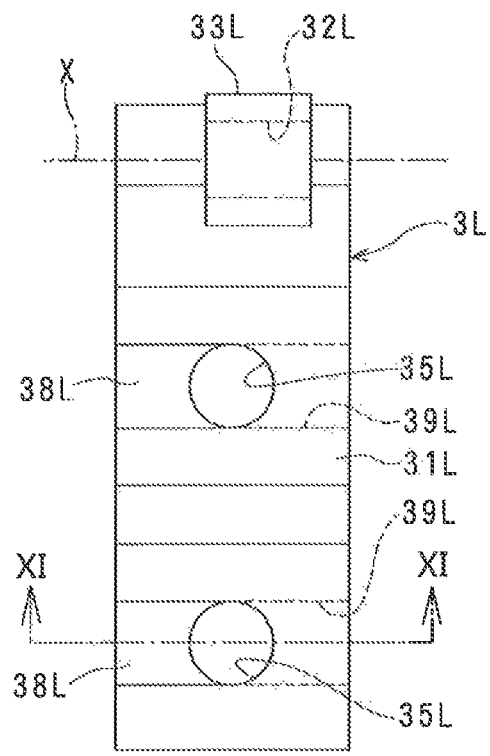
FIG. 11A is a side view of a vehicle body-side base member in a modification of the manufacturing method of the present invention.
Figure 11B:
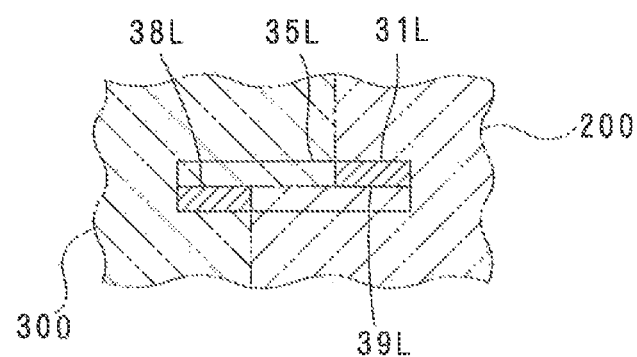
FIG. 11B is a cross-sectional view taken along line XI-XI in FIG. 11A.

FIGS. 11A and 11B show a modification of the method of production the hinge members 2L, 2U, 3L, and 3U according to the present invention by casting.

Figure 1A:
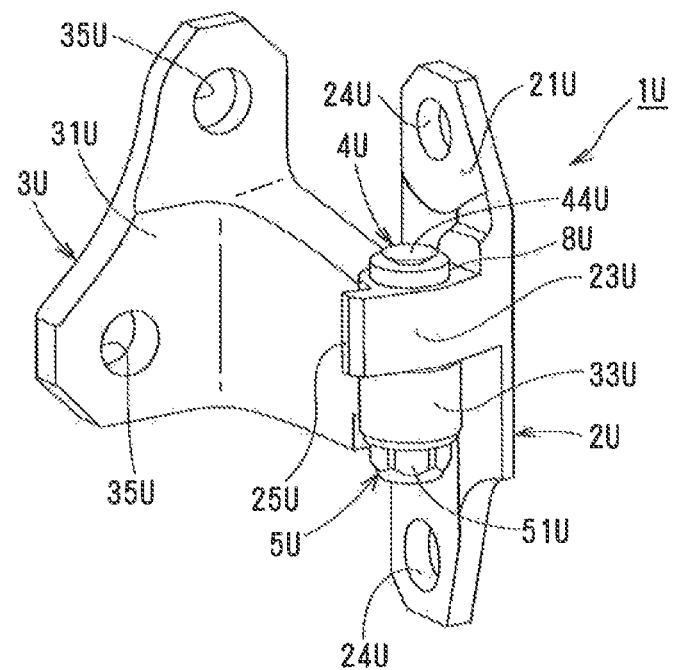
FIG. 1A is a perspective view of an upper door hinge of a vehicle door hinge according to an embodiment of the present invention.
Figure 1B:
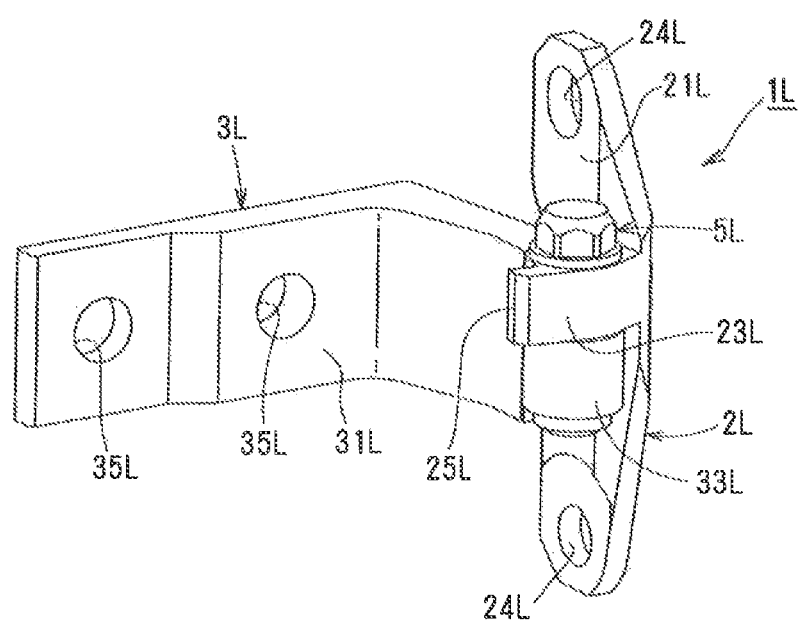
FIG. 1B is a perspective view of a lower door hinge of the vehicle door hinge according to the embodiment.
Figure 2A:
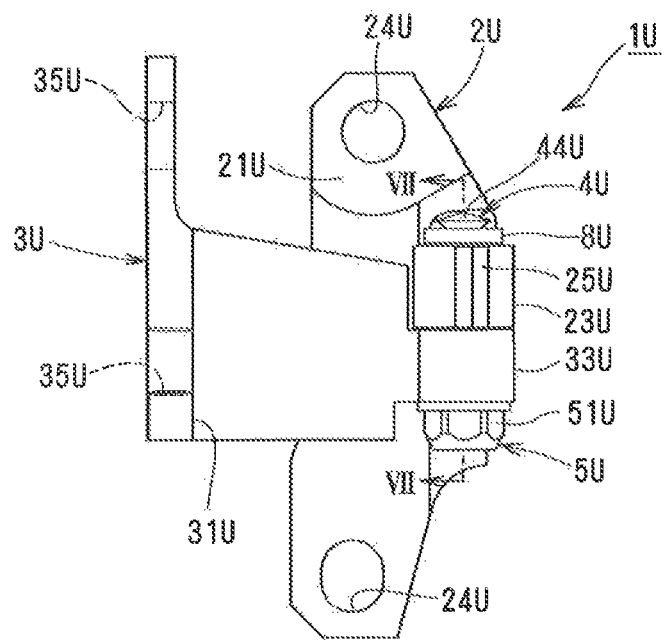
FIG. 2A is a front view of the upper door hinge.
Figure 2B:
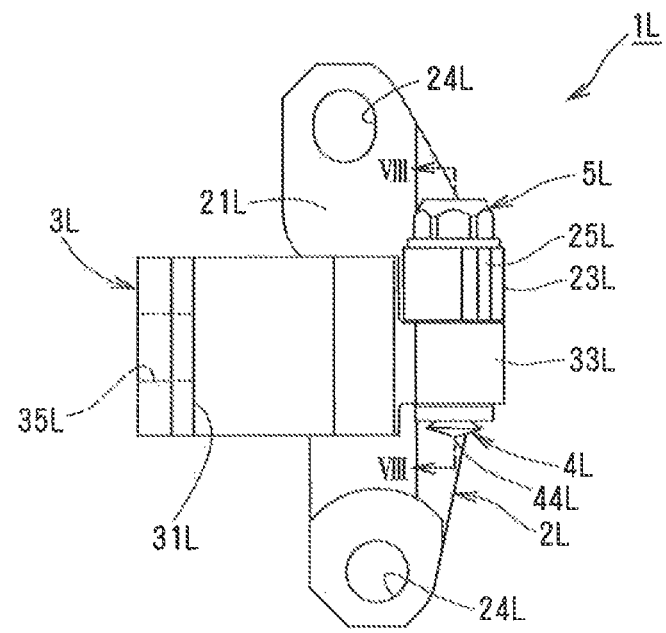
FIG. 2B is a front view of the lower door hinge.

For example, as can be understood from FIG. 1B, in the case where the two mounting holes 35L, 35L are arranged to be separated from each other in the front-rear direction same as the vehicle body side hinge member 3L of the lower door hinge 1L or the mounting hole 35L is a single configuration, the mounting hole 35L can be molded by casting without using a slide core.

This is achieved, as shown in FIGS. 11A and 11B, by configuring the mounting holes 35L, 35L so as not to undercut the fixed metal mold 200 and the movable metal mold 300 movable in the left-right direction in FIG. 11B. That is, a concave portion 38L having a depth that is ½ of the thickness of the base portion 31L is provided on the front surface of the base portion 31L, and a concave portion 39L having a depth that is ½ of the thickness of the base portion 31L is provided on the back surface of the base portion 31L. The concave portion 38L is provided which is parallel to the direction of the central axis X of the shaft hole 32L and is connected to the left half of the mounting hole 35L. The concave portion 39L is provided which is parallel to the central axis X and is connected to the right half of the mounting hole 35L.

Therefore, according to the present invention, when each hinge member 2L, 2U, 3L, 3U is manufactured based on the aluminum die casting manufacturing method, by appropriately changing the position of each mounting hole 24L, 24U, 35L, 35U, the slide core is not necessarily required.

Although embodiments of the present invention are described above, the following various modifications and changes and combinations thereof can be applied to the above embodiments without departing from the gist of the present invention.

(a) At least one base member of the door-side base members 2L, 2U and the vehicle body-side base members 3L, 3U is manufactured by casting using a material made of an aluminum alloy.

(b) Example 1 of a mounting form of the door hinge to the vehicle will be explained based on FIG. 12.

The lower door hinge 1L, the upper door hinge 1U of the left rear door and the lower door hinge 10L, the upper door hinge 10U of the right rear door have a left-right line symmetric structure, respectively.

The lower door hinge 1L for the left rear door is shared with the lower door hinge 20L for the left front door, the upper door hinge 1U for the left rear door is shared with the upper door hinge 20U for the left front door, the lower door hinge 10L for the right rear door is shared with the lower door hinge 30L for the right front door, and the upper door hinge 10U for the right rear door is shared with the upper door hinge 30U for the right front door.

In this case, assembly of the left and right rear doors and front doors with respect to the vehicle body B is a downward movement, and similarly, removal is an upward movement.

By adopting such a configuration, it is possible to promote the sharing of the door hinges 1L and 10L reduce the cost.

Further, in the upper door hinges 1U, 10U, 20U, and 30U, all screwed bodies can be attached to and detached from the hinge shaft from below, and in the lower door hinges 1L, 10L, 20L, and 30L, all screwed bodies can be attached to and detached from the hinge shaft from above, as a result, the door attaching/detaching work can be done easily.

(c) Example 2 of the mounting form of the door hinge to the vehicle will be explained based on FIG. 13.

The lower door hinge 1L, the upper door hinge 1U of the left rear door and the lower door hinge 10L, the upper door hinge 10U of the right rear door have a left-right line symmetric structure, respectively.

The lower door hinge 1L for the left rear door is shared with the upper door hinge 30U for the right front door (the mounting form is a form that the lower door hinge 1L is rotated 180°), the upper door hinge 1U for the left rear door is shared with the lower door hinge 30L for the right front door (the mounting form is a form that the upper door hinge 1U is rotated by 180°), the lower door hinge 10L for the right rear door is shared with the upper door hinge 20U for the left front door (the mounting form is a form that the lower door hinge 10L is rotated 180°), and the upper door hinge 10U for the right rear door is shared with the lower door hinge 20L for the left front door (the mounting form is a form obtained by rotating the upper door hinge 10U by 180°).

In this case, the assembly of the left and right rear doors to the vehicle body B is a downward movement, and the removal is an upward movement.

Further, the assembly of the left and right front doors with respect to the vehicle body B is an upward movement, and the removal is a downward movement.

By adopting such a configuration, it is possible to promote the common use of the lower door hinges 1L and 10L for the door and reduce the cost.

Furthermore, in the upper door hinges 1U, 10U, 20U, and 30U, all screwed bodies can be attached to and detached from the hinge shaft from below, and in the lower door hinges 1L, 10L, 20L, 30L, all screwed bodies can be attached to and detached from the hinge shaft from above. As a result, the door can be easily attached and detached.

(d) Example 3 of the mounting form of the door hinge to the vehicle will be explained based on FIG. 14.

The lower door hinge 1L' and the upper door hinge 1U' of the left rear door and the lower door hinge 10L' and the upper door hinge 10U' of the right rear door have a left-right line symmetric structure, respectively.

The lower door hinge 1L' for the left rear door is shared with the lower door hinge 20L' for the left front door, the upper door hinge 1U' for the left rear door is shared with the upper door hinge 20U' for the left front door, the lower door hinge 10L' for the right rear door is shared with the lower door hinge 30L' for the right front door, and the upper door hinge 10U' for the right rear door is shared with the upper door hinge 30U' for the right front door.

Figure 12:
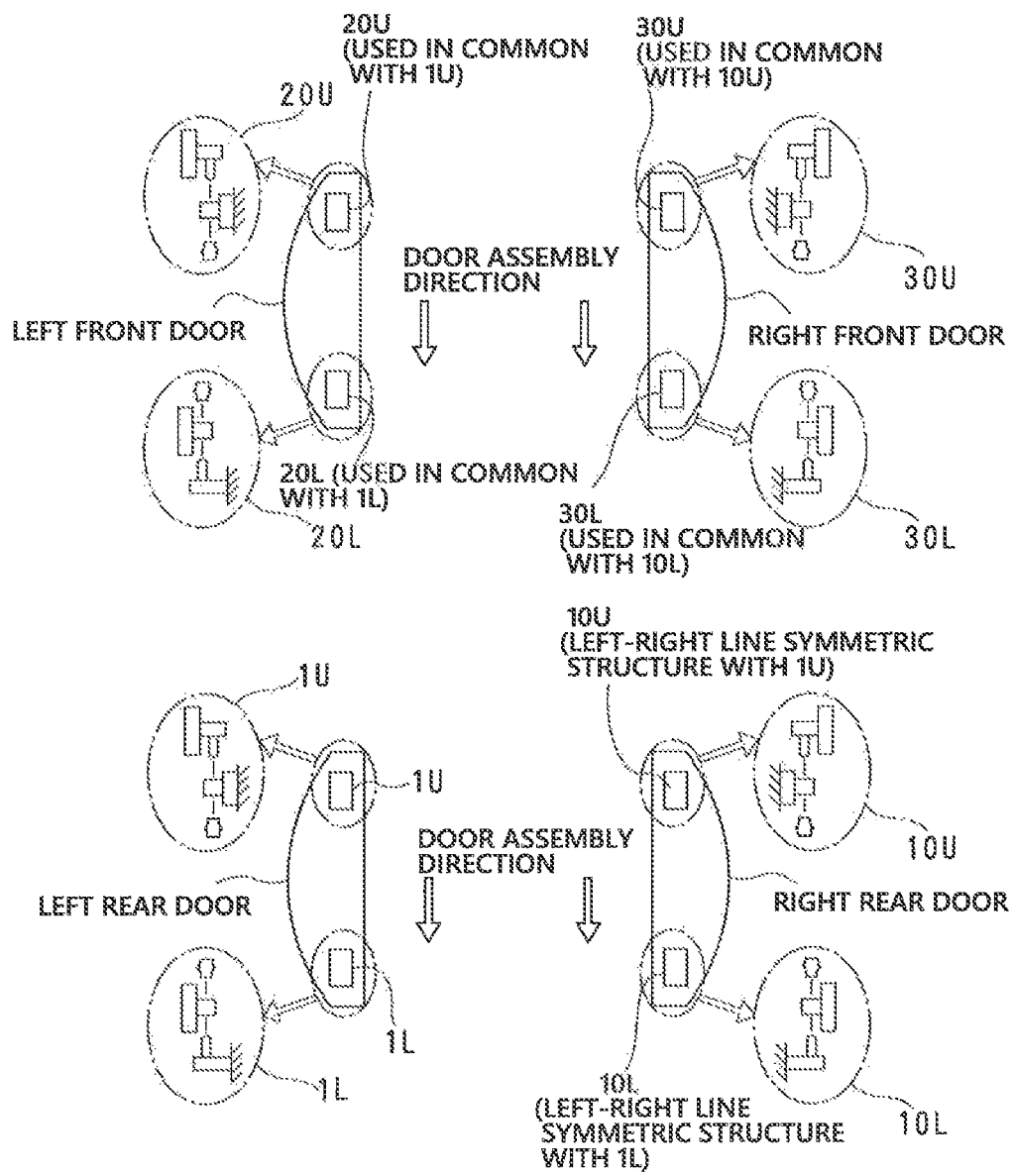
FIG. 12 a diagram for explaining Example 1 of a form of mounting a door hinge to the vehicle.
Figure 13:
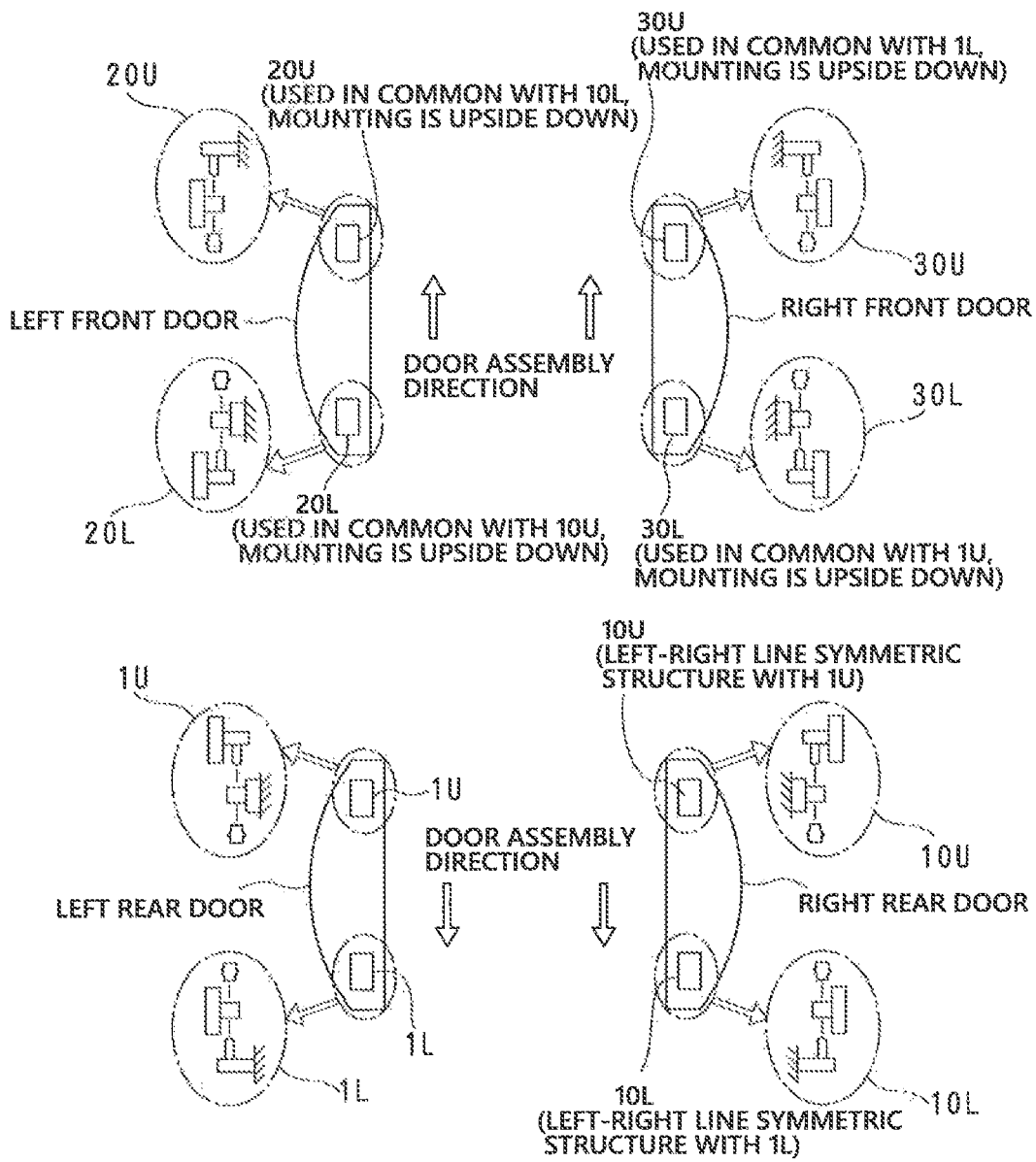
FIG. 13 is a diagram for explaining Example 2 of the mounting form of the door hinge to the vehicle.

In addition, the lower door hinge 1L' is vertical line symmetric structure with the upper door hinge 1U which are shown in FIG. 12 and FIG. 13, and the upper door hinge 1U' is vertical line symmetric structure with the lower door hinge 1U which are shown in FIG. 12 and FIG. 13.

In this case, the rear door on either side and front door attachment to the vehicle body B serve as upward movement, and, similarly removal serves as a downward shift.

By adopting such a configuration, it is possible to promote the common use of door hinges for doors and cost can be reduced.

Furthermore, in the upper door hinges 1U', 10U', 20U', and 30U', all screwed bodies can be attached to and detached from the hinge shaft from below, In the lower door hinges 1L', 10L', 20L', 30L', all screwed bodies can be attached to and detached from the hinge shaft from above. Thereby, the door attaching/detaching work can be done easily.

Figure 15:
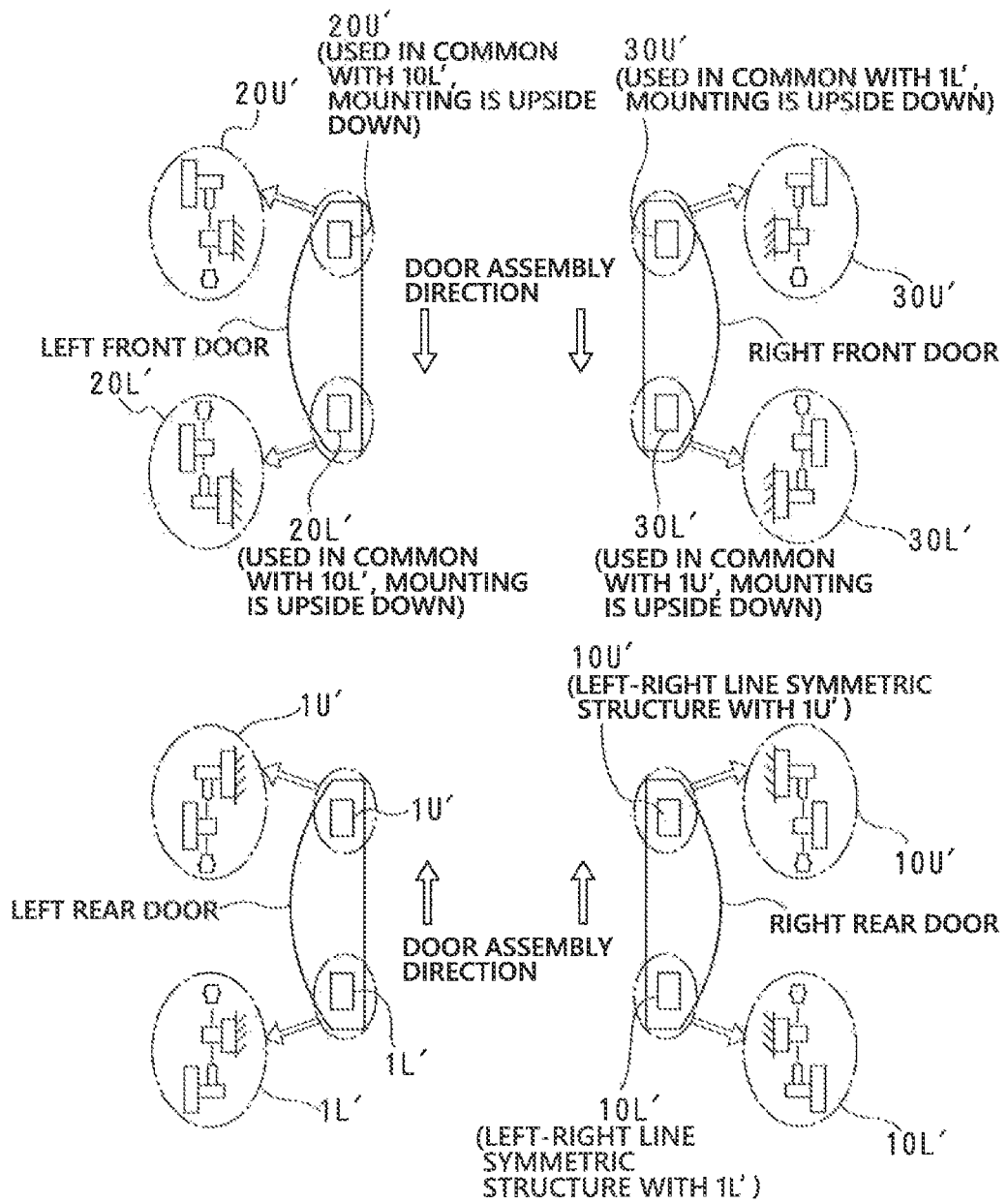
FIG. 15 is a diagram for explaining Example 4 of the mounting form of the door hinge to the vehicle.

(e) Example 4 of the mounting form of the door hinge to the vehicle will be explained based on FIG. 15.

The left rear door lower door hinge 1L' and the upper door hinge 1U' and the right rear door lower door hinge 10L' and the upper door hinge 10U' have a left-right line symmetric structure, respectively.

The lower door hinge 1L' for the left rear door is shared with the upper door hinge 30U' for the right front door (mounting form is a form that the lower door hinge 1L' is rotated 180°), the upper door hinge 1U' for the left rear door is shared with the lower door hinge 30L' for the right front door (mounting form is a form that the upper door hinge 1U is rotated 180°), the lower door hinge 10L' for the right rear door is shared with the upper door hinge 20U' for the left front door (mounting form is a form that the lower door hinge 10L' is rotated 180°), and the upper door hinge 10U' for the right rear door is shared with the lower door hinge 20L' for the left front door (mounting form is a form that the upper door hinge 10U' is rotated 180°).

Figure 14:
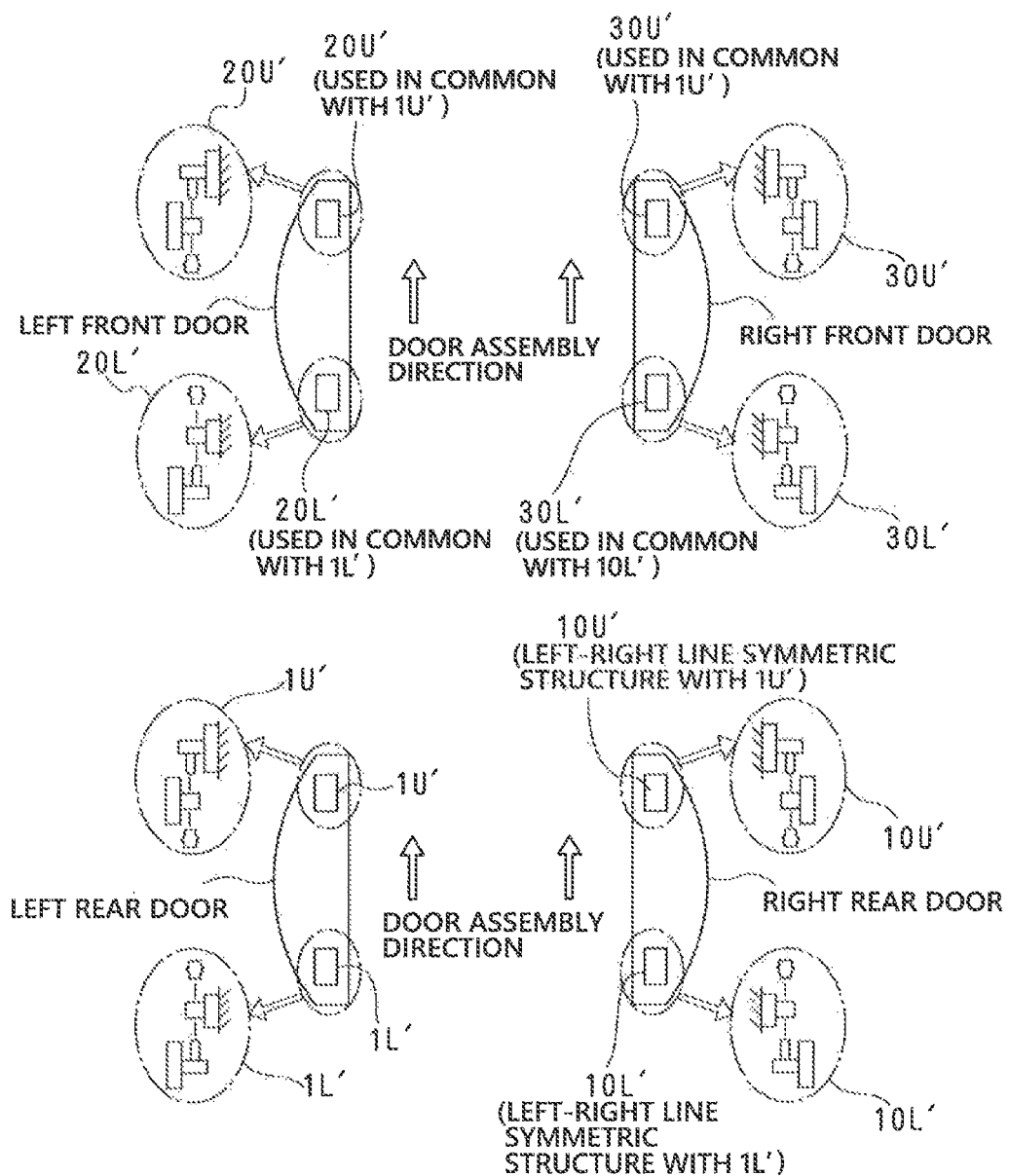
FIG. 14 is a diagram for explaining Example 3 of the mounting form of the door hinge to the vehicle.

Also in this case, similarly to the embodiment shown in FIG. 14, the lower door hinge 1L' has a vertical line symmetric structure with respect to the upper door hinge 1U shown in FIGS. 12 and 13, and the upper door hinge 1U' has a vertical line symmetric structure with respect to the lower door hinge 1L shown in FIGS. 12 and 13.

In this case, the assembly of the left and right rear doors with respect to the vehicle body B is an upward movement, and similarly, the removal is a downward movement.

Further, the assembly of the left and right front doors with respect to the vehicle body B is a downward movement, and similarly, the removal is an upward movement.

By adopting such a configuration, it is possible to promote the common use of door hinges for doors and reduce costs.

Further, in the upper door hinges 1U', 10U', 20U', and 30U', all screwed bodies can be attached to and detached from below from the hinge shaft. In the lower door hinges 1L', 10L', 20L', and 30L', all screwed bodies can be attached to and detached from the hinge shaft from above. Therefore, the door can be easily attached and detached.

The invention claimed is:

1. In a manufacturing method of a vehicle door hinge which supports a door to a vehicle body in a state openable and closable, the vehicle door hinge comprises:
    a door-side base member having a mounting hole into which a bolt for fixing to the door is inserted, and an axial hole extending in a direction perpendicular to the mounting hole;
    a vehicle body-side base member having a mounting hole into which a bolt for fixing to the vehicle body is inserted, and an axial hole extending in a direction perpendicular to the mounting hole,
    a hinge shaft that is inserted into a shaft hole of the door-side base member and a shaft hole of the vehicle body-side base member, respectively, and connects the door-side base member and the vehicle body-side base member that can be rotatable with respect to each other;
    a screwed body that is detachably screwed to one end of the hinge shaft in an axial direction so that the base member on either one of the door-side or the vehicle body-side and the hinge shaft rotate together;
    a bush interposed between the shaft hole of the other base member and the other end portion of the hinge shaft so that the other of the base member on the door side or the vehicle body side and the hinge shaft rotate relative to each other, and
    a retaining portion for preventing the other end portion of the hinge shaft from coming off from the shaft hole of the other base member in the axial direction,
    wherein all parts of the at least one base member of the door-side or the vehicle body-side and the vehicle body-side base member is manufactured by casting using an aluminum alloy as a material.

2. The manufacturing method of the vehicle door hinge according to claim 1, wherein the screwed body has a conical portion that comes into contact with one tapered portion provided at one inlet of the shaft hole of the one base member,
    wherein the hinge shaft has an enlarged diameter conical portion that comes into contact with the other tapered portion provided at the other entrance opposite to the one entrance of the shaft hole of the one base member,
    wherein the conical angle of the conical portion of the screwed body is smaller than the taper angle of the one tapered portion, and
    wherein the conical angle of the enlarged diameter conical portion of the hinge shaft is larger than the conical angle of the conical portion of the screwed body and smaller than the taper angle of the other tapered portion.

3. The manufacturing method of the vehicle door hinge according to claim 1, wherein the vehicle door hinge includes an upper door hinge that supports the upper part of the door, and a lower door hinge that supports the lower part of the door, wherein the upper door hinge is configured such that the screwed body is detachably screwed to one end of the hinge shaft from below, and wherein the lower door hinge is configured such that the screwed body is detachably screwed onto one end of the hinge shaft from above.

4. A vehicle door hinge which supports a door to a vehicle body in a state openable and closable, wherein the vehicle door hinge includes an upper door hinge that supports the upper part of the door, and a lower door hinge that supports the lower part of the door, the vehicle door hinge comprising: a door-side base member having a mounting hole into which a bolt for fixing to the door is inserted, and an axial hole extending in a direction perpendicular to the mounting hole;

a vehicle body-side base member having a mounting hole into which a bolt for fixing to the vehicle body is inserted, and an axial hole extending in a direction perpendicular to the mounting hole, a hinge shaft that is inserted into a shaft hole of the door-side base member and a shaft hole of the vehicle body-side base member, respectively, and connects the door-side base member and the vehicle body-side base member that can be rotatable with respect to each other;

a screwed body that is detachably screwed to one end of the hinge shaft in an axial direction so that the base member on either one of the door-side or the vehicle body-side and the hinge shaft rotate together;

a bush interposed between the shaft hole of the other base member and the other end portion of the hinge shaft so that the other of the base member on the door side or the vehicle body side and the hinge shaft rotate relative to each other, and a retaining portion for preventing the other end portion of the hinge shaft from coming off from the shaft hole of the other base member in the axial direction, wherein the upper door hinge is configured such that the screwed body is detachably screwed to one end of the hinge shaft from below, wherein the lower door hinge is configured such that the screwed body is detachably screwed onto one end of the hinge shaft from above, wherein the screwed body has a conical portion that comes into contact with one tapered portion provided at one inlet of the shaft hole of the one base member, wherein the hinge shaft has, integrally formed, a male screw portion provided on the outer periphery of the hinge shaft and detachably screwed to a female threaded portion provided on the inner peripheral surface of the screwed body, a rotation portion rotatably inserted into the shaft hole of the door side base member and the shaft hole of the vehicle body side base member, and an enlarged diameter conical portion provided between the male screw portion and the rotation portion and having a larger diameter than the rotation portion and comes into contact with the other tapered portion provided at the other entrance opposite to the one entrance of the shaft hole of the one base member, wherein the enlarged diameter conical portion of the hinge shaft has a serration, wherein the conical angle of the conical portion of the screwed body is smaller than the taper angle of the one tapered portion, wherein the conical angle of the enlarged diameter conical portion of the hinge shaft is smaller than the taper angle of the other tapered portion, and wherein the vehicle door hinge is configured such that, due to the relationship of the angles, the conical portion of the screwed body is internally fitted to the one tapered portion and the serration of the hinge shaft is internally fitted to the other tapered portion by a wedge action.

\* \* \* \* \*